(12) United States Patent
Gaillet et al.

(10) Patent No.: US 12,723,881 B2
(45) Date of Patent: Sep. 1, 2026

(54) ADVANCED DATA PROCESSING FOR EFFICIENT CARPOOLING

(71) Applicant: Orange, Issy-les-Moulineaux (FR)

(72) Inventors: Thierry Gaillet, Chatillon (FR); Sylvain Leroux, Chatillon (FR); Laurent Mussot, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 404 days.

(21) Appl. No.: 18/067,385

(22) Filed: Dec. 16, 2022

(65) Prior Publication Data

US 2023/0194273 A1 Jun. 22, 2023

(30) Foreign Application Priority Data

Dec. 16, 2021 (FR) ...................................... 2113692

(51) Int. Cl.
*B60W 40/08* (2012.01)
*G01C 21/34* (2006.01)
*G07C 5/00* (2006.01)

(52) U.S. Cl.
CPC ......... *G01C 21/3438* (2013.01); *G07C 5/008* (2013.01)

(58) Field of Classification Search
CPC ... G01C 21/3438; G07C 5/008; B60W 40/08; G01P 1/00; G06Q 10/02; G06Q 10/04; G06Q 50/40; G08G 1/017; G08G 1/205; H04W 4/40; H04W 4/026; H04W 4/027; H04W 4/023; H04W 4/44
See application file for complete search history.

(56) References Cited

U.S. PATENT DOCUMENTS

| | | | | |
|---|---|---|---|---|
| 10,917,259 B1 * | 2/2021 | Chein | ................... | H04L 12/282 |
| 2008/0248815 A1 * | 10/2008 | Busch | ..................... | H04L 67/52 455/456.5 |
| 2010/0169007 A1 | 7/2010 | Kaushik et al. | | |
| 2011/0090095 A1 * | 4/2011 | Goldmann | ............. | G08G 1/017 340/928 |

(Continued)

FOREIGN PATENT DOCUMENTS

| | | | | |
|---|---|---|---|---|
| KR | 20160042334 A * | 4/2016 | | |
| KR | 20180056059 A * | 5/2018 | ......... | B60R 25/1004 |

(Continued)

OTHER PUBLICATIONS

French Preliminary Search Report for French Patent Application No. FR2113692, dated Jul. 21, 2022.

*Primary Examiner* — Daniel M. Robert
(74) *Attorney, Agent, or Firm* — Knobbe, Martens, Olson & Bear, LLP

(57) ABSTRACT

A determination of a priority to be assigned to a vehicle, carried out by a server. The determination includes: collecting, from a communication network, data concerning at least the identifiers of communicating devices, one of the collected identifiers being associated with the vehicle, determining a number of collocated identifiers according to a selected collocation criterion, the identifier associated with the vehicle being one of the collocated identifiers, and if the number is greater than a threshold, assigning the vehicle a first priority, and if the number is below the threshold, assigning the vehicle a second priority that is lower than the first priority.

14 Claims, 4 Drawing Sheets

(56) References Cited

U.S. PATENT DOCUMENTS

| | | | | |
|---|---|---|---|---|
| 2014/0310075 | A1* | 10/2014 | Ricci | G06F 3/0622 705/13 |
| 2015/0186715 | A1* | 7/2015 | Zhao | G06V 40/103 382/103 |
| 2015/0278617 | A1 | 10/2015 | Oami | |
| 2018/0266844 | A1* | 9/2018 | Heo | G01C 21/3461 |
| 2018/0338225 | A1 | 11/2018 | Shimizu | |
| 2019/0340453 | A1* | 11/2019 | Papineau | G07B 15/063 |
| 2021/0042671 | A1* | 2/2021 | Torrealba Fuenzalida | G07B 15/06 |
| 2021/0174387 | A1* | 6/2021 | Papineau | H04W 4/029 |
| 2023/0342456 | A1* | 10/2023 | Ansari | G06F 21/602 |

FOREIGN PATENT DOCUMENTS

| | | | | |
|---|---|---|---|---|
| WO | WO-2014014501 | A1 * | 1/2014 | H04W 4/21 |
| WO | WO 2020/226671 | A1 | 11/2020 | |

* cited by examiner

INIT CARP: IMOD → SER
S1
LOC (MOD)
S2
LOC (ITER) < R
S3
INCR (t)
S4
SAME (ITER) ?
S5
OK
S8
AI
PR1
OK
N SAME > THR
NOK
DELAY
S9
NOK
PR2
S12
S7
S6
OK
CAP, CAM, ...
S10
RES1, RES2, ...
S11
RES
COM
PROC
MEM
SER

ADVANCED DATA PROCESSING FOR EFFICIENT CARPOOLING

CROSS-REFERENCE TO RELATED APPLICATIONS

This application claims foreign priority to French Patent Application No. FR 2113692, entitled "ADVANCED DATA PROCESSING FOR EFFICIENT CARPOOLING" and filed Dec. 16, 2021, the content of which is incorporated by reference herein in its entirety.

BACKGROUND

Field

This disclosure relates to the field of data processing in the context of carpooling.

Description of the Related Technology

The reduction of the use of fossil fuels, capable of producing greenhouse gases, is becoming a major issue in the automotive sector. Strong growth has already been observed in the use of electrical energy in this sector, as a replacement for fossil fuels. However, the projected electrical energy requirements for travel show that collective travel by vehicle will have to become the norm, while individual travel will be prohibited. Moreover, the growing number of vehicles is already saturating road infrastructures on main roads.

Carpooling solutions are therefore encouraged in order to reduce the number of vehicles on the roads as much as possible, and thus reduce the energy used by all these vehicles.

To organize such carpooling solutions, there are known applications for connecting a motorist using a vehicle, and one or more occasional passengers of this vehicle. The apps generally use people's names, with the passengers and the motorist declaring their identity through the app. The connection also defines a meeting point so the vehicle can be driven there to pick up the passenger(s).

A problem with such applications is that they are simply declarative in general. No verification is carried out as to the actual transport of passengers.

SUMMARY

This disclosure improves the situation.

To this end, it proposes a method for determining a priority to be assigned to a vehicle, carried out by a server and comprising:

- collecting, from a communication network, data concerning at least the identifiers of communicating devices, one of the collected identifiers being associated with said vehicle,
- determining a number of collocated identifiers according to a collocation criterion, said identifier associated with the vehicle being one of said collocated identifiers, and
- assigning said vehicle a priority according to the determined number of collocated identifiers.

The number of communicating devices satisfying this collocation criterion is thus counted, and depending on the determined number of collocated identifiers, or, more precisely in a carpooling application, if this number is in accordance with an expected number and on an expected route, then a priority is assigned which grants a privilege to the vehicle. Such an embodiment thus makes it possible to reduce travel times for vehicles carrying a large number of passengers (for example beyond a threshold of three passengers in addition to the driver in the vehicle), in order to encourage drivers to carry a large number of passengers, thus promoting carpooling. In one embodiment, assigning said vehicle a priority comprises:

- if the number is greater than a threshold, assigning said vehicle a first priority, and
- if the number is below the threshold, assigning the vehicle a second priority that is lower than the first priority.

The number of communicating devices satisfying this collocation criterion is thus counted, and if this number is greater than a threshold, or, more precisely in a carpooling application, if this number is in accordance with an expected number and on an expected route, then a priority is assigned which grants a privilege to the vehicle.

Thus, one of the possible applications of determining the number of people in a vehicle within the meaning of this disclosure may be the regulation of road traffic, in particular to favor vehicles that are in a carpooling situation.

In one embodiment, the assignment of a priority to said vehicle comprises assigning said vehicle a route having said priority. A route is thus assigned to the vehicle according to the determined number of collocated identifiers.

For example, the assignment to said vehicle of a first or second priority comprises: allocating a first route or a second route to said vehicle, the first and second routes respectively having the first and second priorities.

Here, "route" means both a lane of a road and a particular itinerary. Thus, for example, the route having the aforementioned first priority may for example be a left lane of a highway, less congested than a right lane which then has the second priority. Another example of a route having first priority is an electronic toll lane on a highway (faster than the other lanes). Additionally or alternatively, the route having the aforementioned first priority may be an alternative itinerary to a route that takes a congested road. It may also be an authorization to use a lane in the opposite direction on a two-way road in order to pass another vehicle. It may also be a priority given to an intersection or a roundabout.

According to different embodiments, the aforementioned first and second priorities may more generally be:

- different lanes,
- different itineraries,
- an opening of a barrier, or not,
- more generally, different types of processing (parking fees, insurance, tolls, for example reduced to varying degrees depending on the priority granted).

The determination of the number of people in a vehicle may thus be used to assign a particular itinerary to this vehicle, or may be used for other situations, for example to control a toll or parking barrier, to adjust parking or toll costs, etc.

In one embodiment, the method may further comprise:

- making use of artificial intelligence to define strategies for clearing and filling routes with vehicles according to priorities respectively assigned to said vehicles, with a view to regulating road traffic to favor carpooling.

Implementation of the artificial intelligence may be based, for example, on data from a knowledge base for example listing previous similar situations of road congestion, and identifying:

- a first route (series of lanes and/or itineraries) taken by the vehicles which were the fastest to reach their destination, and a second route taken by the vehicles which were the most delayed before reaching their destination.

Typically in this case, the first route can be stored in memory as providing the first priority when taken, and the second route as providing the second priority.

Such an implementation allows regulating the road traffic to give particular preference to vehicles in a carpooling situation.

In one embodiment, the aforementioned criterion is determined by device identifiers including the identifier associated with the vehicle, and having:

a same location, a same speed, and a same direction of movement.

Here, "same location" is understood to mean that the identified devices are located within a radius that is less than a threshold, for example five meters.

Thus, in such an implementation, there is no need for information other than the inventory of identifiers of communicating devices satisfying said criterion. The device identifier may be the IMSI (International Mobile Subscriber Identity) for example for a terminal such as a smartphone, without necessarily having to disclose other information. The identity of the passengers thus typically does not need to be disclosed and the device identifier can for example be deleted from a temporary storage memory (after verifying said criterion possibly a plurality of successive times).

Such an implementation thus solves a problem linked to the usual carpooling applications, which most often are name-based (declaring the passengers' identities) and which thus contravene regulations for the protection of private data (in particular Europe's General Data Protection Regulation or "GDPR") when a correlation can be made between the person's identity and the destination where the person is headed, via the shared data managed by such applications within the meaning of the prior art.

Such an implementation, within the meaning of this disclosure, is compatible however with regulations on the protection of private data. Indeed, an implementation of this method can be "App-less" (i.e. not requiring an application on a terminal or some other means linking all the devices to be identified for the collocation): the aforementioned server collects all the data for verifying this collocation, while relying only on device identifiers and without making any correlation with the people who actually possess such devices. The resulting advantage is in particular the compliance with private data regulations ("GDPR").

In one embodiment, the aforementioned method may further comprise:

repeating the determination of the number of collocated identifiers, the assignment of the priority being dynamic in each collocation determination.

Thus, the satisfying of carpooling conditions with the assignment of a priority (such as a priority route) can be carried out in real time.

In one embodiment, the method may further comprise:

in the event of a previous assignment of priority, and non-reception of one of the identifiers among the collocated identifiers, deferring a change in the assignment of priority, for a number of iterations of the method which can be selected.

Indeed, it is possible that within a segment of the vehicle's trip, one of the devices is no longer seen by the network (turned off by the user or no longer capturing a signal). In this case, the processing at a server receiving the devices' data (IMSI for a smartphone for example) postpones to a later time the decision to stop the assignment of a privileged route for example, and repeatedly runs the collocation test. Thus, in such an embodiment, if the identifier of a device is "lost" because the device is no longer "seen" by the communication network, the method is repeated a predetermined number of times while continuing to assign the first priority to the vehicle. Thus, if after repeating the method, the device whose identifier was previously lost is once again seen by the network, and continues to satisfy the aforementioned criterion, then it can be assumed that the "lost" device was still on board the vehicle during the time interval when it was no longer seen by the network, which justifies the assignment of the first priority during this time interval.

In one embodiment, the method may further comprise:

collecting data from sensors detecting the presence of users in the vehicle in order to confirm the determined number of collocated identifiers.

The presence sensors may be, for example, weight sensors on the seats or seat belt closure sensors or sensors detecting the opening then closing of a door, or a number of faces detected by the central mirror of the vehicle, or others.

Such an implementation then allows, for example in the event of a loss of the identifier of one of the devices because it is no longer "seen" by the network, continuing to count the presence of the same number of passengers in the vehicle (same number of occupied seats for example) according to the data sent from these sensors to the server. More generally, it allows confirming the number of passengers present in the vehicle against the number of device identifiers detected as collocated with the identifier associated with the vehicle.

In an additional or alternative implementation, the method may comprise:

collecting data from sensors located in a road environment of the vehicle, concerning the presence of users in the vehicle, in order to confirm the determined number of collocated identifiers.

These sensors located in the road environment may be, for example, cameras (at road sign height or other) capable of detecting the number of faces in a captured image (not necessarily identifying these faces). They may also be beacons, WiFi networks, and/or others.

In one embodiment, the method may further comprise:

in the event of loss of reception by said communication network of at least one of the identifiers among the collocated identifiers, implementing a cooperative platform across a plurality of communication networks comprising said communication network and at least one separate communication network, for determining whether said at least one separate communication network is receiving data from said at least one of the identifiers among the collocated identifiers, and if said at least one separate communication network is receiving data from said at least one of the identifiers among the collocated identifiers, determining said number of collocated identifiers with location data of said at least one of the identifiers among the collocated identifiers, said location data being provided by said separate communication network.

Thus, in such an embodiment, in the event of the loss of a device identifier which is no longer seen by the network, the method can rely on a cooperative platform across several communication networks to determine whether at least one other network is still detecting the lost identifier, collocated with for example the identifier associated with the vehicle (or at least one of the identifiers collocated with the identifier of the vehicle). Such an implementation thus makes it possible to multiply by that many networks the chances of tracking the location of a device.

In one embodiment, the communicating device of the vehicle comprises an autonomous driving module of the vehicle, the method comprising the issuing of an instruction to such a module to take a route which is in accordance with said determined number of collocated identifiers.

In such an embodiment, the vehicle may be in autonomous driving mode and in real time can take the route assigned to it, for example a route with lighter traffic if the priority assigned to it is high (the aforementioned first priority for example).

Alternatively, in one embodiment, the communicating device of the vehicle comprises a terminal comprising a human-machine interface available to a user of the vehicle (driver or passenger of the vehicle), the method comprising the issuing of a recommendation message to the terminal in order to offer the user, via said human-machine interface, a recommendation to take a route which is in accordance with said determined number of collocated identifiers.

In this alternative embodiment, the driver of the vehicle, for example, receives recommendations on his or her terminal (for example a smartphone) of routes to take, typically with priority routes if the carpooling conditions are met.

The term "identifier associated with the vehicle" thus means the identifier:

- of a dedicated communicating device, integrated into the vehicle or retrofitted, for example a communicating device comprising a navigation device (of the type referred to as "GPS"),
- or of an autonomous driving module (i.e. for driving the vehicle automatically without driver intervention other than monitoring),
- or an identifier of a terminal available to the driver or to any passenger of the vehicle (for example an IMSI identifier of a smartphone), this terminal itself being able to execute a driving assistance application (for example a navigation application) with a display of lane/road recommendations.

According to another aspect, a computer program is provided comprising instructions for implementing all or part of a method as defined herein when this program is executed by a processor. According to another aspect, a non-transitory, computer-readable storage medium is proposed on which such program is stored.

In particular, such a computer program, in addition to counting the number of identifiers per vehicle, may make use of artificial intelligence to define strategies for the clearing and filling of roads (and/or lanes of roads) with vehicles, according to the priorities assigned to these vehicles, on the basis of previous similar road congestion situations. Such an implementation allows regulating road traffic to favor carpooling.

This disclosure also relates to a device for determining a priority to be assigned to a vehicle. The device may comprise:

- a communication interface for communicating with a communication network in order to collect data concerning at least the identifiers of communicating devices, one of the collected identifiers being associated with a vehicle, and
- a processing circuit for determining a number of collocated identifiers according to a selected collocation criterion, said identifier associated with the vehicle being one of said collocated identifiers, and for assigning said vehicle a priority according to the determined number of collocated identifiers.

BRIEF DESCRIPTION OF THE DRAWINGS

Other features, details, and advantages will become apparent upon reading the detailed description below, and upon analyzing the appended drawings, in which.

DETAILED DESCRIPTION OF CERTAIN ILLUSTRATIVE EMBODIMENTS

Figure 1:
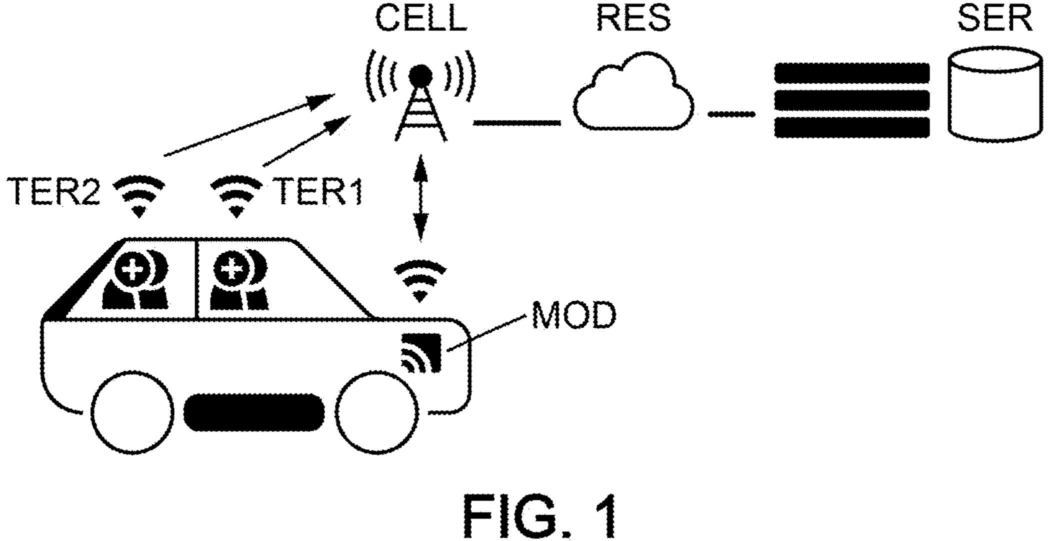
FIG. 1 illustrates an embodiment in which devices TER1, TER2 of passengers of a vehicle are collocated with a communicating module MOD installed in the vehicle.

Reference is now made to FIG. 1. A vehicle is carrying a plurality of passengers who have communicating devices TER1, TER2, such as smartphones or tablets, connected to a wide-area network RES. In the embodiment illustrated in FIG. 1, the vehicle itself is equipped with a module MOD (for example a communication module of the "GSM chip" type, possibly integrated into an autonomous driving module of the vehicle, or into a vehicle navigation device, etc.). The wide-area network RES may for example be a cellular network equipped with base stations each covering a cell CELL.

The network RES can detect, in the messages that pass through the base stations, the identifiers of the devices TER1, TER2, MOD (for example IMSI or other identifiers) and can determine the location of these devices TER1, TER2, MOD according to the base station involved in these transmissions. In practice, several base stations can be used via triangulation to pinpoint the positions of these devices, with a detection accuracy of under five meters.

When for example the module MOD is active, this module MOD can transmit a message to the server SER. Reception of this message at the server SER triggers the querying of the network RES to determine a number of devices TER1, TER2 identified as currently collocated with the module MOD. For example, the identifiers of the devices TER1, TER2, MOD are detected in messages sent up by a same base station CELL, and in addition a triangulation over a plurality of base stations determines that these devices are located in a same zone of less than five meters in radius. A first collocation information item for these devices TER1, TER2, MOD may be stored in the memory of the server SER. This step can be repeated at a later time and if the same devices TER1, TER2, MOD are again collocated in a same area of less than five meters in radius, the server SER can determine that these devices are moving at the same speed and in the same direction. The server SER can count the number of devices TER1, TER2, in addition to the module MOD, that are collocated with the module (MOD), and can determine that the vehicle equipped with this module MOD is in a carpooling situation if this number is greater than a threshold (for example more than two passengers). In this case, the server SER assigns a first priority to this vehicle.

In the example of FIG. 1, a double arrow between the network RES (via the base station) and the module MOD illustrates the case where the module MOD is sending data to the network, but is also receiving data from the network RES, in particular data for autonomous driving of the vehicle, or even data recommending lanes or roads to be taken, for example displayed by a navigation device equipped with such a module MOD.

Figure 2:
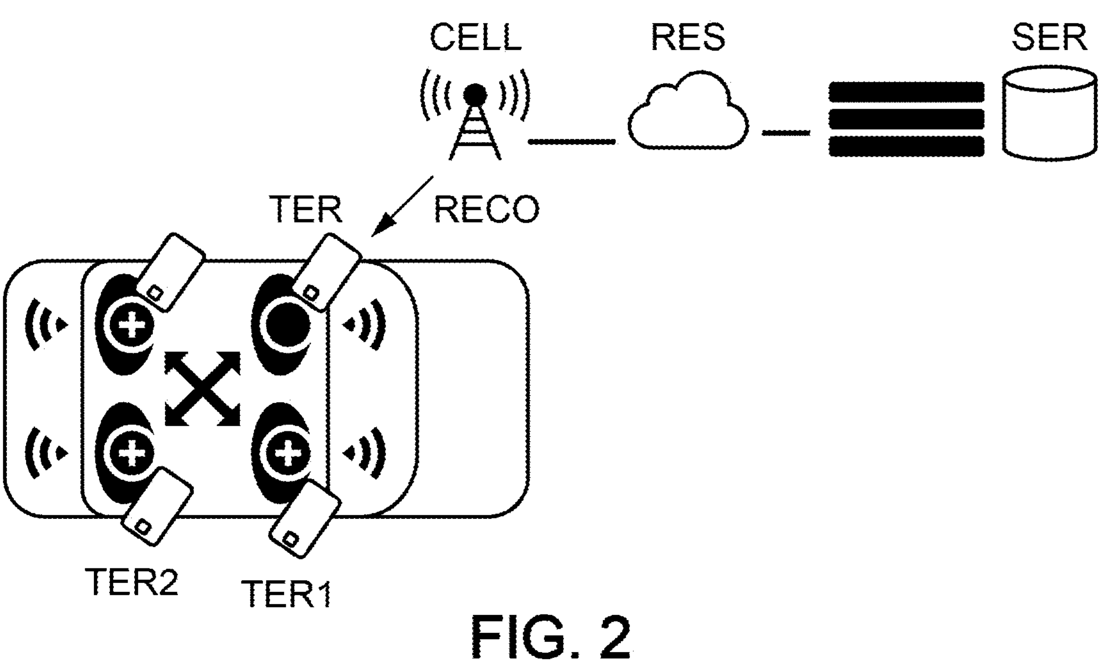
FIG. 2 illustrates an embodiment in which devices TER1, TER2 of passengers of a vehicle here are collocated with a device TER available to the driver (for example a smartphone).

FIG. 2 illustrates an alternative embodiment to the example shown in FIG. 1. In this alternative, the vehicle is not specifically equipped with an integrated module MOD. In the example of FIG. 2, a user of the vehicle such as the driver has a communicating device TER (for example a smartphone or a tablet) which can replace the module MOD. Thus, if other devices are collocated with device TER (in a greater number than the aforementioned threshold), the server SER can assign the aforementioned first priority to this vehicle. Typically in this case, the server can transmit recommendation data (RECO arrow in FIG. 2) to the terminal TER, recommending lanes and/or roads to be taken (for example the left lane on a highway and/or an alternative faster itinerary), linked to this first priority. For this purpose, an application may be installed on device TER. Moreover, the launch of this same application by the user of device TER can trigger the transmission of a message from device TER and to the server SER in order to begin detection of the collocation of devices TER1, TER2 with device TER.

Figure 3:
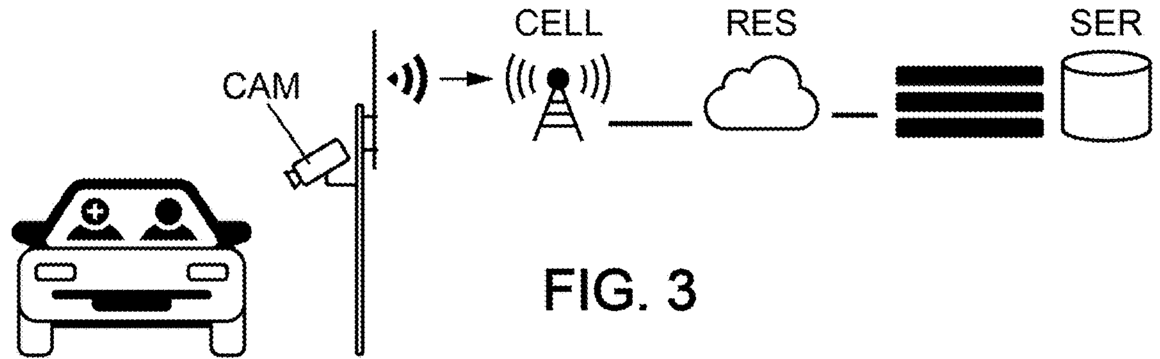
FIG. 3 illustrates an embodiment in which the detection of people in the vehicle is confirmed by devices CAM of a road infrastructure.

The collocated devices TER1, TER2 can thus be identified by interaction with the network RES as described with reference to FIGS. 1 and 2. In addition, detection of the number of passengers in the vehicle may be carried out by making use of other sensors. In the example of FIG. 3, a camera CAM for example can identify the vehicle (by its license plate for example) and detect the number of passengers actually present in the vehicle (without necessarily identifying them). The sensor used here may be a camera, or any device of a road infrastructure, for example such as WiFi or Bluetooth connection points at the edge of the road, or others. The data returned by such "sensors" may be aggregated by the server SER to confirm (or corroborate in the event of a temporary loss of the network by one of the devices TER1, TER2) the number of passengers present in the vehicle.

In addition to or as an alternative to such an embodiment, sensors CAP internal to the vehicle may send data to the server SER, relating to the presence of passengers in the passenger compartment of the vehicle, for example via the module MOD. Such an embodiment is illustrated by way of example in FIG. 4. Such sensors may be, for example, detectors of passenger door closures or of engaged seat belts, or of weight on the seats of the passenger compartment, or other sensors. Such an embodiment makes it possible, for example, to further confirm the presence of a passenger even if the network RES is no longer detecting the device TER1 of this passenger (in the event, for example, of a loss of connection or of switching to "airplane" mode or simply powering off a smartphone for example).

Figure 5:
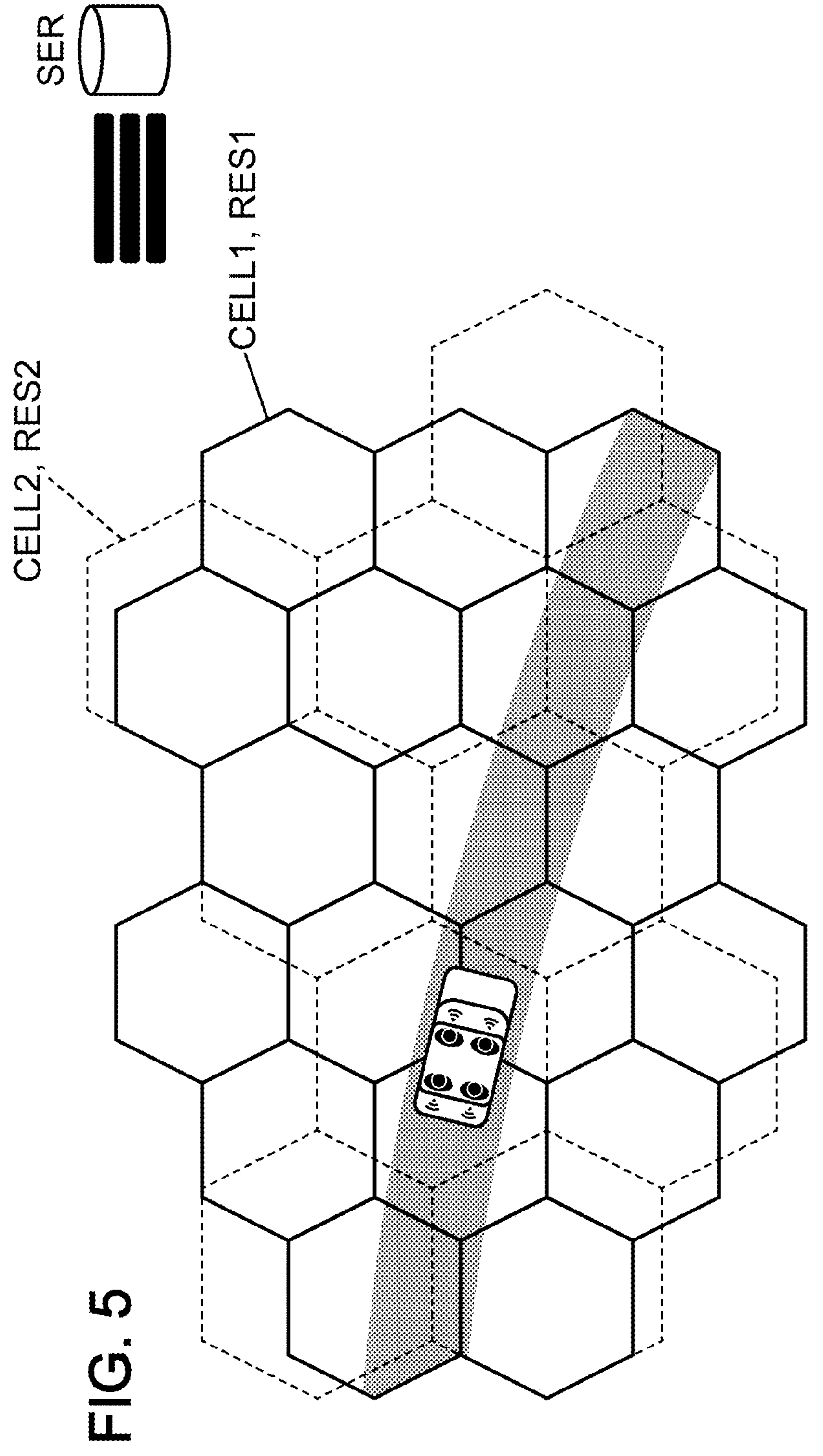
FIG. 5 illustrates an embodiment in which the detection of collocated devices TER1, TER2 can be carried out by one or several networks RES1, RES2 in collaboration.

Nevertheless, in addition to or as an alternative to the use of such sensors, it is possible that the first network RES1 with which a device TER1 is usually connected no longer sees this device TER1 due to a loss of connection to the network RES1, but another network RES2 (for example a second cellular network, or a WiFi network with multiple connection points) is still managing to detect this device. FIG. 5 illustrates such an embodiment. In this case, the server SER can query a collaborative platform to obtain the current location of this device TER1, in "roaming" mode.

Figures 6, 7:
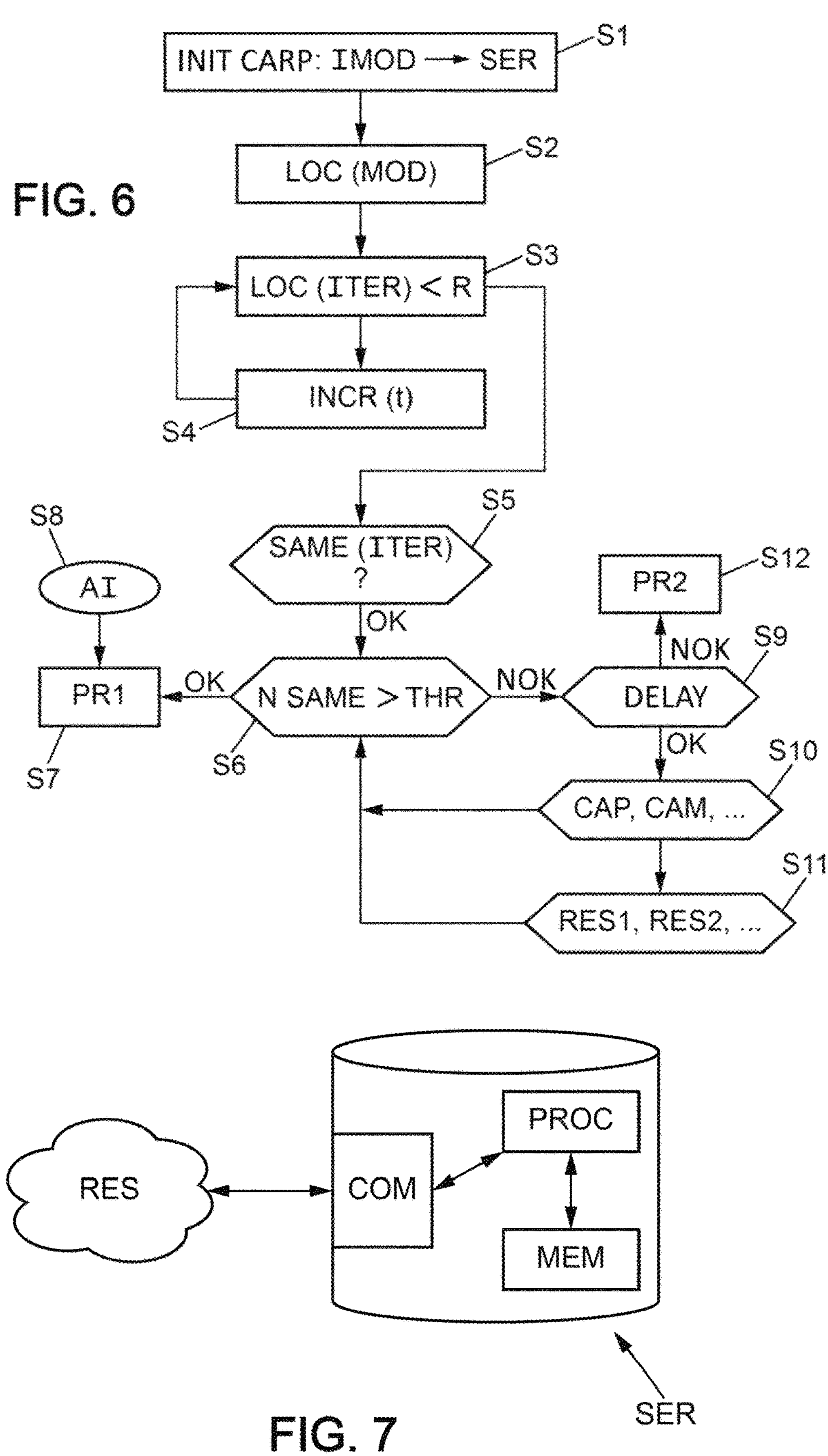
FIG. 6 illustrates an embodiment of an exemplary method within the meaning of this disclosure.
FIG. 7 illustrates an embodiment of an exemplary device for implementing the method within the meaning of this disclosure.

Referring now to FIG. 6 illustrating an exemplary implementation of a method of the type presented above, a first step S1 may consist of the initiation of a carpooling declaration, for example by the driver of the vehicle. For this purpose, the driver may, for example, send a message from an available smartphone to the server SER.

In step S2, the server SER can locate this smartphone or alternatively the module MOD of the vehicle (with which the aforementioned smartphone was previously declared to the server SER, for example by the driver). For example, the server SER can locate the identifier IMOD of the module MOD (or the identifier of the aforementioned smartphone) in the data sent by a cell of a cellular network of the type illustrated in FIG. 5.

In step S3, the server can locate, in the same manner, devices located geographically in the same area as the module MOD, for example within a radius R (for example five meters) around the module MOD. This step is repeated later on, for example by incrementing a time counter in step S4. Thus, in step S5, the server determines the identifiers of devices ITER which are still located in the same zone as the module MOD. In particular, the server can verify in this step S5 that the same devices have moved at the same speed and in the same direction as the module MOD, thus fulfilling the aforementioned collocation criterion.

The server then counts, in step S6, the number of devices thus collocated with the module MOD. If this number is greater than a threshold THR (for example more than two people present in the vehicle), then the server can determine that the vehicle equipped with the module having identifier IMOD is in a carpooling situation.

In this case, the server can determine and at least temporarily store the assignment of a first priority to this vehicle in step S7. This priority may consist of allocating a fast lane on a highway, or an alternative, less congested road, or other privileged treatment as presented above. It may also involve an authorization to overtake slower vehicles, or a priority granted at a crossroads or for entering a roundabout, or others. Typically, an artificial intelligence AI may be used in step S8 for defining the best paths and/or routes to use to ensure priority for this vehicle relative to other vehicles.

In the case of autonomous driving of the vehicle, for example ensured by the module MOD, the server SER may transmit data to the module about lanes/roads to be taken relating to a privileged route. In the case where the module MOD is simply a navigation device (of the "GPS" type), the server SER can transmit data recommending lanes/roads to be taken along this privileged route. These same data may also be transmitted to a device TER such as a smartphone for example or a tablet, available to a user of the vehicle (for example the driver or one of the passengers). This device then displays the recommendations of proposed lanes/roads to the user, as presented above with reference to FIG. 2.

In the test step S6, in the event that the number of people in the vehicle is less than or equal to the threshold THR (arrow NOK exiting test S6), a delay is applied in step S9 before assigning a priority lower than priority PR1, for example a second priority PR2 in step S12 (arrow NOK exiting the time delay S9). This priority PR2 is lower than priority PR1 in that, for example in the case where the vehicle is in autonomous driving mode, this vehicle is forced to stay in a slower right-hand lane of a highway (or other scenarios). In the case where the vehicle is not in autonomous driving mode, the location of the module MOD or of the driver's device TER for example can allow checking whether the vehicle is complying with the constraints linked to priority PR2 (if, for example, the vehicle is not using a lane/road reserved for a vehicle with first priority PR1) in order to possibly implement penalties (fines or other) against the driver of the vehicle.

Figure 4:
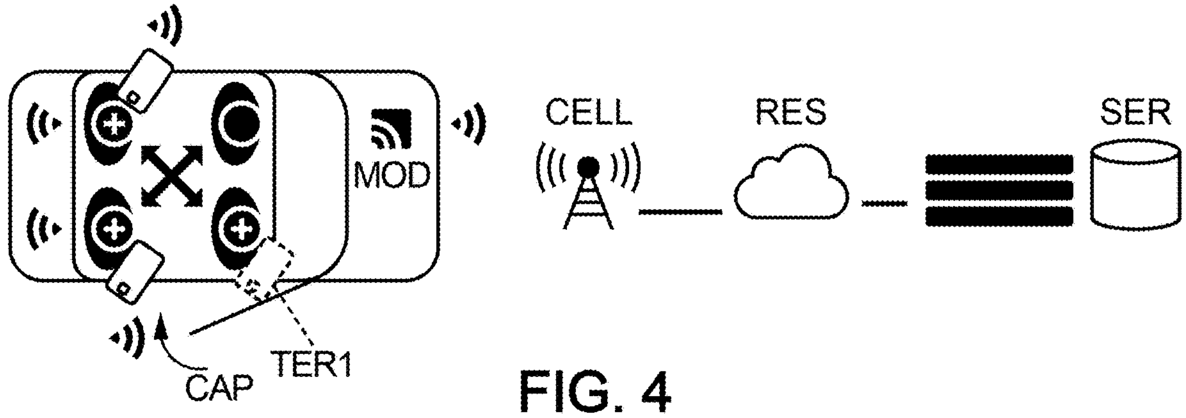
FIG. 4 illustrates an embodiment in which the detection of people in the vehicle is confirmed by sensors CAP detecting the presence of passengers in the passenger compartment of the vehicle, and connected to the module MOD of FIG. 1.

In the time delay step S9, as long as the delay has not ended (after for example about ten time increments in step S4), the server may also use measurements made by sensors CAP within the vehicle (for example ones that sense closing doors, engaged seat belts, weight on the seats, etc., as presented above with reference to FIG. 4). These measurements can be uploaded to the wide-area network RES by the module MOD (or a passenger's device TER) and thus be used by the server SER in step S10. The server can thus determine, even if at least one of the devices TER1 of a passenger is no longer covered by the network RES, that the information thus captured nevertheless confirms that the number of passengers in the vehicle has remained constant since the last test S6, and in this case the first priority PR1 can continue to be assigned to this vehicle. Likewise, the server SER may use, in step S10, sensor data sent by the road infrastructures. These sensors may for example be WiFi terminals which line the roads and detect a device TER1 which is temporarily no longer covered by the network RES, or cameras CAM which determine the number of people in the vehicle, as illustrated in FIG. 3 described above.

In addition, still during the time delay S9, as presented above with reference to FIG. 5, in the event of a loss of network RES1 by one of the devices TER1, this device TER1 may continue to be "seen" by a second network RES2 (cellular or WiFi). In this case, the server SER may connect to a collaborative platform (typically in what is referred to as "roaming" mode) in order to recover from the second network RES2 the location data for the identifier of the device TER1, in step S11. Based on the location data sent back by the second network RES2, the server may further determine a collocation of the device in the vehicle and, where appropriate, determine that the criterion of step S6 is satisfied in order to continue to allocate the first priority PR1 to the vehicle.

The data collected other than by the detection of identifiers via network RES1 can thus confirm the detection of collocation, in particular in the event of a loss of network by at least one of the devices present in the vehicle.

Of course, this collection of data (from sensors CAP internal to the vehicle or of the road infrastructure CAM, or from other networks RES2), may be carried out simultaneously with and in parallel with steps S3, S5, to potentially confirm the presence of the number of passengers detected.

In addition, even if the data sent by means CAP, CAM, RES2, etc., do not provide the server SER with the number of passengers which had been determined in steps S5-S6, but a lower number for example, the server can wait for the end of the time delay of step S9 before actually allocating the second priority PR2.

FIG. 7 schematically represents an embodiment of a device for implementing the method defined above. Such a device may be of the server SER type and comprise:

- a communication interface COM for communicating with a communication network RES in order to collect data concerning at least the identifiers of communicating devices, one of the collected identifiers being associated with a vehicle, and
- a processing circuit PROC, MEM for determining a number of collocated identifiers according to a chosen collocation criterion, said identifier associated with the vehicle being one of said collocated identifiers, and
- if the number is greater than a threshold, assigning said vehicle a first priority, and
- if the number is below the threshold, assigning the vehicle a second priority that is lower than the first priority.

Typically, the aforementioned processing circuit may comprise a processor PROC and a memory MEM accessible by the processor in order to execute the method presented above. This memory MEM may store in particular the instruction code data of a computer program within the meaning of this disclosure.

The invention claimed is:

1. A method for determining a priority to be assigned to a vehicle, carried out by a server and the method comprising:
   - collecting, from network infrastructure elements of a wide area communication network, data related at least to identifiers of communicating devices, one of the collected identifiers being assigned to a dedicated communicating device associated with the vehicle;
   - determining a number of collocated identifiers according to a collocation criterion, the identifier assigned to the dedicated communicating device associated with the vehicle being one of the collocated identifiers; and
   - assigning the vehicle a priority according to the determined number of collocated identifiers,
   - wherein the dedicated communicating device is the only one of the communicating devices required to run an application for collocating identifiers.

2. The method according to claim 1, wherein assigning the vehicle a priority comprises:
   - if the number is greater than a threshold, assigning the vehicle a first priority, and
   - if the number is below the threshold, assigning the vehicle a second priority that is lower than the first priority.

3. The method according to claim 2, wherein assigning the vehicle a first or second priority comprises:
   - assigning the vehicle a first route or a second route, the first and second routes respectively having the first and second priorities.

4. The method according to claim 1, further comprising:
   - using artificial intelligence to define strategies for clearing and filling routes with vehicles according to priorities respectively assigned to the vehicles, with a view to regulating road traffic to favor carpooling.

5. The method according to claim 1, wherein the criterion is determined by device identifiers including the identifier assigned to the dedicated communicating device associated with the vehicle, and having:
   - a same location,
   - a same speed, and
   - a same direction of movement.

6. The method according to claim 1, comprising:
   - repeating the determination of the number of collocated identifiers, the assignment of the priority being dynamic in each collocation determination.

7. The method according to claim 1, comprising:
   - in the event of a previous assignment of priority, and non-reception of one of the identifiers among the collocated identifiers, deferring a change of assignment of priority, for a number of iterations of the method.

8. The method according to claim 1, comprising:
   - collecting data from sensors detecting the presence of users in the vehicle in order to confirm the determined number of collocated identifiers.

9. The method according to claim 1, comprising:

collecting data from sensors located in a road environment of the vehicle, concerning the presence of users in the vehicle, to confirm the determined number of collocated identifiers.

10. The method according to claim 1, comprising:

in the event of loss of reception by the communication network of at least one of the identifiers among the collocated identifiers, implementing a cooperative platform across a plurality of communication networks comprising the communication network and at least one separate communication network, for determining whether the at least one separate communication network is receiving data from the at least one of the identifiers among the collocated identifiers; and if the at least one separate communication network is receiving data from the at least one of the identifiers among the collocated identifiers, determining the number of collocated identifiers with location data of the at least one of the identifiers among the collocated identifiers, the location data being provided by the separate communication network.

11. The method according to claim 1, wherein the communicating device of the vehicle comprises an autonomous driving module of the vehicle, the method comprising issuing of an instruction to the module to take a route which is in accordance with the determined number of collocated identifiers.

12. The method according to claim 1, wherein the communicating device of the vehicle comprises a terminal comprising a human-machine interface available to a user of the vehicle, the method comprising issuing of a recommendation message to the terminal in order to offer the user, via the human-machine interface, a recommendation to take a route which is in accordance with the determined number of collocated identifiers.

13. A non-transitory computer-readable storage medium on which is stored a computer program on a server, wherein the computer program is executed by a processor, and wherein the computer program determines a priority to be assigned to a vehicle by:

collecting, from network infrastructure elements of a wide area communication network, data related at least to identifiers of communicating devices, one of the collected identifiers being assigned to a dedicated communicating device associated with the vehicle;

determining a number of collocated identifiers according to a collocation criterion, the identifier assigned to the dedicated communicating device associated with the vehicle being one of the collocated identifiers; and assigning the vehicle a priority according to the determined number of collocated identifiers, wherein the dedicated communicating device is the only one of the communicating devices required to run an application for collocating identifiers.

14. A device for determining a priority to be assigned to a vehicle, the device comprising:

a communication interface for communicating with a communication network in order to collect, from network infrastructure elements of a wide area communication network, data related at least to identifiers of communicating devices, one of the collected identifiers being assigned to a dedicated communicating device associated with a vehicle; and a processing circuit configured to determine a number of collocated identifiers according to a collocation criterion, the identifier assigned to the dedicated communicating device associated with the vehicle being one of the collocated identifiers, and configured to assign the vehicle a priority according to the determined number of collocated identifiers, wherein the dedicated communicating device is the only one of the communicating devices required to run an application for collocating identifiers.

* * * * *